US012681287B2

(12) United States Patent
Schlaudraff et al.

(10) Patent No.: US 12,681,287 B2
(45) Date of Patent: Jul. 14, 2026

(54) SAMPLE MANIPULATION DEVICE AND METHOD

(71) Applicant: LEICA MICROSYSTEMS CMS GMBH, Wetzlar (DE)

(72) Inventors: Falk Schlaudraff, Wetzlar (DE); Florian Hoffmann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 360 days.

(21) Appl. No.: 18/337,098

(22) Filed: Jun. 19, 2023

(65) Prior Publication Data

US 2024/0004179 A1     Jan. 4, 2024

(30) Foreign Application Priority Data

Jul. 4, 2022    (EP) .................................... 22182830

(51) Int. Cl.
  *G02B 21/32*     (2006.01)
  *G02B 21/00*     (2006.01)
  *G02B 21/36*     (2006.01)
(52) U.S. Cl.
  CPC ......... *G02B 21/32* (2013.01); *G02B 21/0032* (2013.01); *G02B 21/365* (2013.01)
(58) Field of Classification Search
  CPC ... G02B 21/32; G02B 21/0032; G02B 21/365
  See application file for complete search history.

(56) References Cited

U.S. PATENT DOCUMENTS

2019/0120734 A1     4/2019   Baer et al.
2020/0319446 A1*   10/2020   Georgiadis ........... G02B 21/006

FOREIGN PATENT DOCUMENTS

EP            3951472 A1     2/2022

* cited by examiner

*Primary Examiner* — Georgia Y Epps
*Assistant Examiner* — Don J Williams
(74) *Attorney, Agent, or Firm* — LEYDIG, VOIT & MAYER, LTD.

(57)            ABSTRACT

A sample manipulation device includes a manipulation light source configured to emit manipulation light, an objective configured to focus the manipulating light onto the sample to form a manipulation light beam, a scanning unit configured to move the manipulation light beam within a field of view of the objective, a sample positioning unit configured to move the sample relative to an optical axis of the objective, and a controller configured to receive manipulation data comprising at least one manipulation path, upon determining that the manipulation path is entirely outside the predetermined area, control the manipulation light source and the scanning unit such that the sample is manipulated along the manipulation path, and upon determining that at least a part of the manipulation path is inside the predetermined area, control the sample positioning unit to move the sample such that the manipulation path is entirely outside the predetermined area.

15 Claims, 6 Drawing Sheets

SAMPLE MANIPULATION DEVICE AND METHOD

CROSS REFERENCE TO RELATED APPLICATIONS

This application claims benefit to European Patent Application No. 22182830.4, filed on Jul. 4, 2022, which is hereby incorporated by reference herein.

FIELD

Embodiments of the present invention relate to a sample manipulation device, a method for manipulating a sample, and a computer program product.

BACKGROUND

Sample manipulation devices are used in microscopy to manipulate, in particular to cut samples. The most common type of manipulation device is a laser microdissection device. A laser microdissection device uses laser light focused by an objective of a microscope to cut the sample. The sample is typically a thin tissue section and is cut in order to isolate specific cells or other microscopic regions of interest. These regions of interest may be determined in advance by another device, e.g., for higher throughputs. From this determination of the regions of interest manipulation data is generated comprising information about the regions of the sample to be manipulated. This manipulation data is transferred to the sample manipulation device, and then used to perform the manipulation. However, since the manipulation data is not generated by the sample manipulation device itself, some post-processing is needed to adapt the manipulation data to the specific sample manipulation device. This requires experience and familiarity with the sample manipulation device making it difficult for an unexperienced user to use the sample manipulation device.

SUMMARY

Embodiments of the present invention provide sample manipulation device. The sample manipulation device includes a manipulation light source configured to emit manipulation light, an objective configured to focus the manipulating light onto the sample to form a manipulation light beam, a scanning unit configured to move the manipulation light beam within a field of view of the objective, a sample positioning unit configured to move the sample relative to an optical axis of the objective, and a controller. The controller is configured to receive manipulation data comprising at least one manipulation path. The manipulation path is a path on the sample. The controller is further configured to determine whether at least a part of the manipulation path is within a predetermined area of the field of view of the objective, based upon a determination that the manipulation path is entirely outside the predetermined area, control the manipulation light source and the scanning unit such that the sample is manipulated along the manipulation path, and based upon a determination that at least a part of the manipulation path is inside the predetermined area, control the sample positioning unit to move the sample such that the manipulation path is entirely outside the predetermined area.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
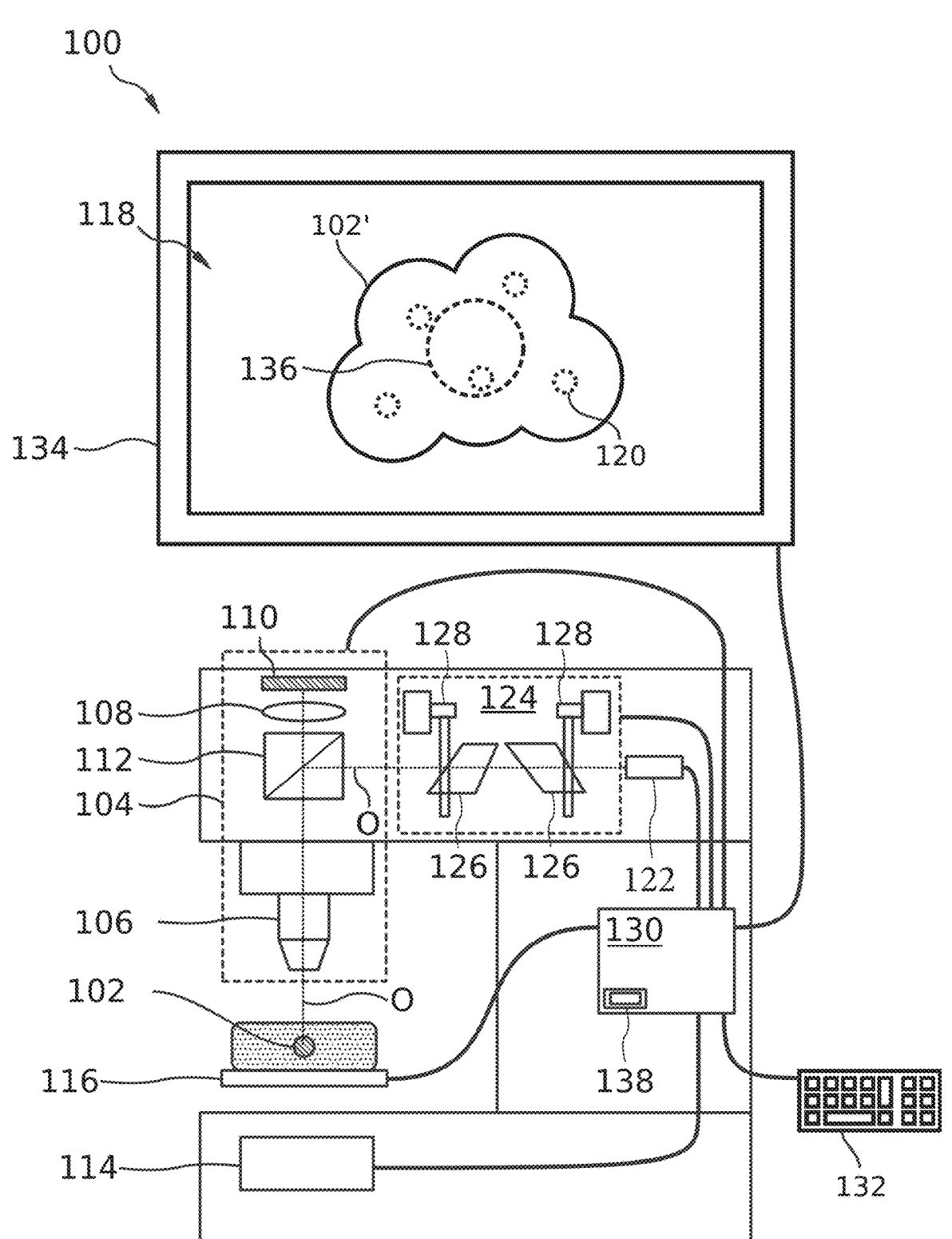
FIG. 1 is a schematic view of a sample manipulation device according to an embodiment.

Embodiments of the present invention provide a sample manipulation device and a method for manipulating a sample that are easy to use, in particular by an unexperienced user.

According to some embodiments, a sample manipulation device for manipulating a sample comprises a manipulation light source configured to emit manipulation light, an objective configured to focus the manipulating light onto the sample to form a manipulation light beam, a scanning unit configured to move the manipulation light beam within a field of view of the objective, a sample positioning unit configured to move the sample relative to an optical axis of the objective, and a controller configured to receive manipulation data comprising at least one manipulation path. The manipulation path is a path on the sample. The controller is further configured to determine whether at least a part of the manipulation path is within a predetermined area of the field of view of the objective, when the manipulation path is entirely outside the predetermined area, to control the manipulation light source and the scanning unit such that the sample is manipulated along the manipulation path, and when at least a part of the manipulation path is inside the predetermined area, to control sample positioning unit to move the sample such that the manipulation path is entirely outside the predetermined area.

The predetermined area is a part of the field of view of the objective. Therefore, the predetermined area corresponds to different regions along the beam path of the manipulation light between the manipulation light source and the sample facing side of the objective. It was found that it may be disadvantageous to direct the manipulation light through certain regions along this beam path. For example, the scanning unit might not be capable of moving the manipulation light beam with the same precision and/or speed in every part of the field of view of the objective. In order to maintain the same level of precision, and to perform the manipulation of the sample at a high speed, the manipulation light beam should not be moved through these parts of the field of view of the objective where the scanning unit is slow and/or imprecise. In this example, the predetermined area may be selected to include these parts. In another example, an optical element arranged along the beam path may comprise an optical defect. Directing the manipulation light through the optical defect may for example deflect the manipulation light or diminish the power of the manipulation light, which in turn negatively affects the effectiveness of the manipulation light beam. In this case, the predetermined area may be selected such that the manipulation light is not directed through the defect.

The sample manipulation device is configured to manipulate the sample along the manipulation path using the manipulation light beam. In order to manipulate the sample, the controller of the sample manipulation device first determines whether the manipulation path at least partially lies within the predetermined area. Only if the manipulation path does not lie within the predetermined area, the sample is manipulated along the manipulation path with the manipulation light beam. Otherwise, the sample is moved by the sample positioning unit such that the manipulation path lies entirely outside the predetermined area. The sample is never manipulated along a manipulation path which lies at least partially within the predetermined area. Accordingly, the manipulation light is never directed through the aforementioned regions along the beam path corresponding to the predetermined area. Thereby, the aforementioned negative effects on the manipulation light beam are automatically avoided. Further, by automatically positioning the sample such that that the manipulation path lies entirely outside the predetermined area, the sample manipulation device automatically positions the sample for optimal manipulation. Thus, the sample manipulation device assists the user in using the sample manipulation device optimally. Thereby, the sample manipulation device is very easy to use allowing even an inexperienced user to use the sample manipulation device to manipulate a sample.

According to an embodiment, the manipulation data comprises at least two manipulation paths. The controller may be configured to determine for each of the manipulation paths whether at least a part of the manipulation path is within the predetermined area, to determine a first set of manipulation paths comprising manipulation paths that are entirely outside the predetermined area, to determine a second set of manipulation paths comprising manipulation paths that are at least partially inside the predetermined area, to control the manipulation light source and the scanning unit such that the sample is manipulated along the manipulation paths of the first set of manipulation paths, and to control sample positioning unit to move the sample such that at least one manipulation path of the second set of manipulation paths is entirely outside the predetermined area.

In this embodiment, the sample manipulation device is configured to manipulate the sample along at least two paths using the manipulation light beam. For each manipulation path the controller determines whether the manipulation path is within the predetermined area. The manipulation paths are then divided into the first set and the second set by the controller. The sample manipulation device then manipulates the sample along all the manipulations paths in the first set. After that, the sample is moved such that at least one manipulation path of the second set of manipulation paths is entirely outside the predetermined area. The controller may then redetermine for each of the remaining manipulation paths whether the manipulation path is within the predetermined area. Based on that determination, the controller may then redetermine the first set and the second set and repeat the process until the sample has been manipulated along all manipulation paths. Thereby, the sample manipulation according to the present embodiment assists the user in manipulating the sample along a large number of manipulation paths. This increases the versatility of the sample manipulation device while the sample manipulation device remains very easy to use.

According to another embodiment, the controller is configured to determine whether the manipulation path is entirely within the field of view of the objective, when the manipulation path is entirely within the field of view of the objective and outside the predetermined area, to control the manipulation light source and the scanning unit such that the sample region is manipulated along the manipulation path, and when the manipulation path is not entirely within the field of view of the objective or at least a part of the manipulation path is inside the predetermined area, to control sample positioning unit to move the sample such that the manipulation path is inside the field of view of the objective and outside the predetermined area.

The manipulation light beam can only be directed towards a point of the sample that is within the current field of view of the objective. When a manipulation path lies partially outside the field of view of the objective, only the part of the manipulation path inside the field of view of the objective can be manipulated using the manipulations light beam. The remaining part of the manipulation path needs to be manipulated after the sample has been moved, and the remaining part now lies within the field of view of the objective. Thus, some of the manipulation paths may need to be traversed twice or even more. With an increasing number of manipulation paths, this becomes time consuming very fast. Therefore, in this embodiment, the sample is manipulated only along manipulation paths. This not only reduces the time needed to manipulate the sample along a large number of manipulation paths but also further assists the user making the sample manipulation device even easier to use.

According to another embodiment, the scanning unit comprises two prisms which are arranged rotatably around the optical axis between the manipulation light source and the objective. The optical axis is optical axis of objective or extension thereof, e.g. via a beam splitter. Each of the prisms deflects the manipulation light depending on the rotation of the prism. The beam deflection caused by each of the prims add up vectorially. Thus, by rotating the two prisms, the manipulation light beam can be moved inside the field of view of the objective. In particular, the rotation of the prisms also causes a change of the beam offset at the output of the scanning unit. This beam offset compensates for the lateral deflection of the manipulation light beam, which is otherwise generated in the plane of the objective pupil. As a result, the manipulation light beam always passes through the pupil of the objective regardless of the deflection angle. In the present embodiment, it is possible to leave the sample stationary, and to move manipulation light beam over the specimen with minimal effort. In an alternative embodiment, the scanning unit comprises at least one scanning minor device. The scanning mirror device may be configured to achieve at least a comparable functionality compared to the scanning unit comprising the two prisms.

According to another embodiment, the predetermined area comprises the optical axis of the objective. The negative optical effects affecting the beam path of the manipulation light are stronger for beams closer to the optical axis of the objective. Thus, by selecting the predetermined area around the optical axis of the objective, the precision of the sample manipulating device is increased.

According to another embodiment, the size and the position of the predetermined area may be determined by the positioning capabilities of the prisms of the scanning unit in the field of view of the objective, for example the rotation speed and aligned rotations of the prisms. While the prisms of the scanning unit are not directly visible in the field of view of the objective, the prisms are optically active elements that affect the beam path of the manipulation light. By setting the predetermined area in accordance with positioning capabilities of the prisms of the scanning unit in the field of view of the objective, the deteriorating effects of the prisms on the beam path of the manipulation light are mitigated. Thereby, the precision of the sample manipulating device is increased.

Preferably, the predetermined area comprises at least 5% of the field of view of the objective, and at most 25% of the field of view of the objective, in particular at least 10% of the field of view of the objective, and at most 20% of the field of view of the objective. When the size of the predetermined area is chosen too small, the negative effects on the beam path of the manipulation light may become too great. However, when the size of the predetermined area is chosen too large, the sample needs to be moved more often since more manipulation paths will be within the predetermined area. This slows the manipulation process down. By choosing the size of the predetermined area within the above region, a good compromise between mitigating deteriorating effects on the beam path and speed of the manipulation device is realized.

According to another embodiment, the controller is configured to determine the predetermined area based on at least one of an optical parameter of the objective, and an optical parameter of the scanning unit. Many parameters influence the beam path of the manipulation light, and thus the quality of the manipulation light beam. However, the objective and the scanning unit have the biggest influence. For example, the magnification of the objective has an influence on the optimal size of the predetermined area, since the magnification of the objective may amplify other optical effects. The higher the magnification of the objective, the larger the predetermined area should be chosen. Considering the scanning unit, the biggest influence on the beam path of the manipulation light is the type of scanning unit. In the above embodiment using two prisms, the exact geometry of the prism has an influence on the optimal shape, size and position of the predetermined area. Other optical parameters may be taking into consideration. For example, the objective may be mounted to the sample manipulation device by a c-mount. In this case, the optimal shape, size and position of the predetermined area also depend on optical parameters of the c-mount, for example a magnification.

According to another embodiment, the sample manipulation device comprises an input unit configured to receive a user input. The controller may be configured to generate the manipulation data based on the user input. The input unit may for example be a keyboard and/or mouse used in combination with a monitor or other display device configured to display an image of the sample. In this embodiment, the user may determine the manipulation paths using the sample manipulation device itself instead of an external device. This makes the sample manipulation device self-sufficient. Further, since the manipulation data is generated by the sample manipulation device itself, no post-processing is needed to adapt the manipulation data is to the sample manipulation device, making the sample manipulation device even easier to use.

According to another embodiment, the sample manipulation device is configured to receive the manipulation data via a data storage device and/or a computer network. In this embodiment, the sample manipulation device is configured to receive the manipulation data from an external source. This makes the sample manipulation device more versatile. In this embodiment, the sample manipulation device may also be a specialized device configured for manipulation the sample only. Such a specialized device can be made very compact.

According to another embodiment, the controller is configured to generate the manipulation data using machine learning. In this embodiment, the sample manipulation device is configured to generate the manipulation data itself. For example, the controller may be configured to perform a sematic segmentation of an image of the sample using machine learning in order to determine regions of interest that are to be manipulated. For example, certain areas may be determined to be a specific type of cell that is to be isolated from the rest of the sample. The result of the image segmentation may then be used to determine manipulation paths, for example by determining the borders of the regions of interest to be the manipulation paths. Thus, the use of machine learning can greatly aid the determination of regions of interest, and thereby improve the ease of use of the sample manipulation device. Further, in this embodiment, no post-processing is needed to adapt the manipulation data is to the sample manipulation device, making the sample manipulation device easier to use.

Machine learning techniques include but are not limited to support vector machines and neural networks. Most machine learning techniques require either supervised or unsupervised training using an appropriate training dataset. The choice of the training dataset depends on the specific task of the machine learning technique used. In the above example of detecting regions of interest in the image of the sample, the appropriate training dataset would consist of images, in particular images captured by means of a microscope, of various samples, for example tissue sections, comprising various regions of interest, for example cell types.

According to another embodiment, the manipulation light beam is configured to cut the sample. The manipulation path is a path on the sample along which the sample is to be cut. In this embodiment, the sample manipulation device is configured for microdissection. The sample manipulation device may be used to cut out specific cells or other microscopic regions of interest, for example from a thin tissue section.

The sample manipulation device may also be configured for other types of sample manipulation. For example, the manipulation light beam may be configured to excite fluorophores located in the sample. The manipulation light may also be configured to activate other light sensitive compounds, for example caged compounds that release a reagent when activated by the manipulation light beam. In this example, manipulation path is a path on the sample along which the fluorophores are excited and/or the light sensitive compounds are activated, respectively. In another example, the manipulation light beam may be configured to move parts of the sample, in particular parts of the sample that have previously been cut out, for example by utilizing radiation pressure.

According to another embodiment, the manipulation light source is a laser light source. In particular, the manipulation light source is UV laser light source. Depending on the specific application, an IR-laser light source or laser light source emitting laser light in the visible spectrum may also be used. Laser light can be focused to a very narrow width, typically around 1 μm, and therefore be used to make very fine cuts which do not damage the surrounding sample. In this embodiment, the sample manipulation device is configured for laser microdissection.

According to another embodiment, the sample positioning unit is configured to move the sample in a plane perpendicular to the optical axis of the objective. The sample positioning unit may be a sample stage, in particular an X-Y-table. Such stages and tables can be used to position the sample very precisely in the field of view of the objective, thereby increasing the precision of the sample manipulation device.

According to another embodiment, the sample manipulation device is a microscope. A microscope may provide magnification allowing the user to see small details of the sample that would not be visible to the unaided eye. The magnification allows the user to perform micromanipulation, in particular microdissection using the sample manipulation device.

Embodiments of the present invention also relate to a method for manipulating a sample. The method comprises the following steps: Receiving manipulation data comprising at least one manipulation path, wherein the manipulation path is a path on the sample. Determining whether at least a part of the manipulation path is within a predetermined area of a field of view of an objective of the sample manipulation device. When the manipulation path is entirely outside the predetermined area, manipulating the sample along the manipulation path. When at least a part of the manipulation path is inside the predetermined area, moving the sample such that the manipulation path is entirely outside the predetermined area.

The method has the same advantages as the sample manipulation device described above and can be supplemented using the features of the dependent claims directed at the sample manipulation device.

Embodiments of the present invention further relate to a computer program product comprising a program code configured to perform the method described above when the computer program product is run on a processor.

The computer program product has the same advantages as the sample manipulation device and the method described above and can in particular be supplemented using the features of the dependent claims directed at the sample manipulation device and the method, respectively.

FIG. 1 is a schematic view of a sample manipulation device 100 according to an embodiment.

The sample manipulation device 100 is exemplary formed as a microscope. Therefore, in the present embodiment, the sample manipulation device 100 is configured to both image and to manipulate a sample 102.

For imaging the sample 102, the sample manipulation device 100 comprises an optical detection system 104. The optical detection system 104 comprises an objective 106, a tube lens 108, and a detector element 110. The objective 106 is directed at the sample 102, and configured to receive detection light from the sample 102. The detection light is then directed by the objective 106 towards the detector element 110 via the tube lens 108. The detector element 110 is configured to generate images of the sample 102 from the detection light. In the present embodiment, a beam splitter 112 is arranged between the objective 106 and the tube lens 108, in order to allow both imaging and manipulating the sample 102 through the single objective 106. The beam splitter 112 is configured to direct the detection light towards the detector element 110 via the tube lens 108. The beam splitter 112 may be a dichroic beam splitter. An illumination system 114 configured for illuminating the sample 102 is exemplary arranged below the sample 102. However, sample illumination can also be accomplished by a further illumination light source (not shown) which illuminates the sample through the objective 106.

The sample 102 is arranged on a sample positioning unit 116, exemplary formed as a microscope stage. The sample positioning unit 116 is configured to move the sample 102 relative to an optical axis O of the objective 106. In particular, the sample positioning unit 116 is configured to move the sample 102 in a plane perpendicular to the optical axis O of the objective 106 and may also be configured to move the sample in the direction of the optical axis O. By means of the sample positioning unit 116, the sample 102 can be automatically and precisely positioned in a field of view 118 of the objective 106.

For manipulating the sample 102, the sample manipulation device 100 is configured to use a manipulation light beam formed from manipulation light. The manipulation light may in particular be a laser light, since laser light may be easily focused into a narrow beam which allows very precise manipulation. The sample 102 is manipulated along one or more manipulation paths 120, i.e. paths on the sample 102, by moving the manipulation light beam over the sample 102. The manipulation paths 120 are shown in FIG. 1 as dotted circles in the field of view 118. Manipulating the sample 102 may include cutting the sample 102 with the manipulation light beam, i.e. microdissection. However, manipulating the sample 102 may also include moving parts of the sample 102 utilizing radiation pressure exerted by the manipulation light beam. In particular, moving parts of the sample 102 that have been cut. Manipulating the sample 102 may further include activating light-sensitive compounds, for example fluorophores or caged compounds, located in the sample 102 with the manipulation light beam.

For generating the manipulation light, the sample manipulation device 100 comprises a manipulation light source 122. The manipulation light is focused into the sample 102 by the objective 106 in order to form the manipulation light beam. In the present embodiment, the manipulation light is directed into the objective 106 by the beam splitter 112 which is arranged in the beam path between the manipulation light source 122 and the objective 106. The manipulation light emitted by the manipulation light source 122 propagates through the two prisms 126 and is deflected by the beam splitter 112 such that it propagates along the optical axis O and through the objective 106. The beam splitter 112 splits the beam path originating from the sample through the objective 106 into two distinct paths, one path extending towards the detector element 110 and another path extending to the manipulation light source 122. Thereby, the beam splitter 112 allows the objective 106 to be used for both imaging and manipulating the sample 102.

In order to move manipulation light beam, the sample manipulation device 100 comprises a scanning unit 124. The scanning unit 124 is arranged between manipulation light source 122 and the objective 106. In the present embodiment, the scanning unit 124 comprises two prisms 126. The two prisms 126 are arranged rotatable around the optical axis O of the objective 106, and configured to deflect the manipulation light depending on their rotation. Thus, by rotating the two prisms 126, the manipulation light beam can be moved relative to the sample 102 inside the field of view 118 of the objective 106. The scanning unit 124 further comprises a drive unit 128 for each of the two prisms 126.

The two drive units 128 are configured to rotate the prisms 126 independently of each other.

The sample manipulation device 100 further comprises a control unit 130, an input unit 132, and an output unit 134. The control unit 130 is configured to receive a user input via the input unit 132, and to display visual information to the user via the output unit 134. The input unit 132 is exemplary shown to be a keyboard, but may also comprise a computer mouse and/or a stylus for use with a touch screen. The output unit 134 is exemplary shown as a monitor. The input unit 132 and the output unit 134 may also be a single element, for example a touch screen. In FIG. 1, the output unit 134 exemplary displays the field of view 118 of the objective 106 and an image 102' of the sample. The output unit also displays the shape, size and position of a predetermined area 136 shown as a dashed circle in FIG. 1. The predetermined area 136 is an area in the field of view 118 of the objective 106 where it is disadvantageous to direct the manipulation light through. The predetermined area 136 will be described in more detail below with reference to FIG. 2.

The control unit 130 also comprises an external interface 138, and is configured to receive data via the external interface 138. The external interface 138 may comprise a connector for a storage device, for example a flash drive, and/or a connection to a computer network, such as a local area network or the internet.

Further, the control unit 130 is configured to perform a method for manipulating the sample 102 using the sample manipulation device 100. In order to perform the method, the control unit 130 is connected to the optical detection system 104, the sample positioning unit 116, the illumination system 114, the manipulation light source 122, and the scanning unit 124, and is configured to control the aforementioned elements. The method will be described in more detail below with reference to FIGS. 2 to 6.

Figure 2:
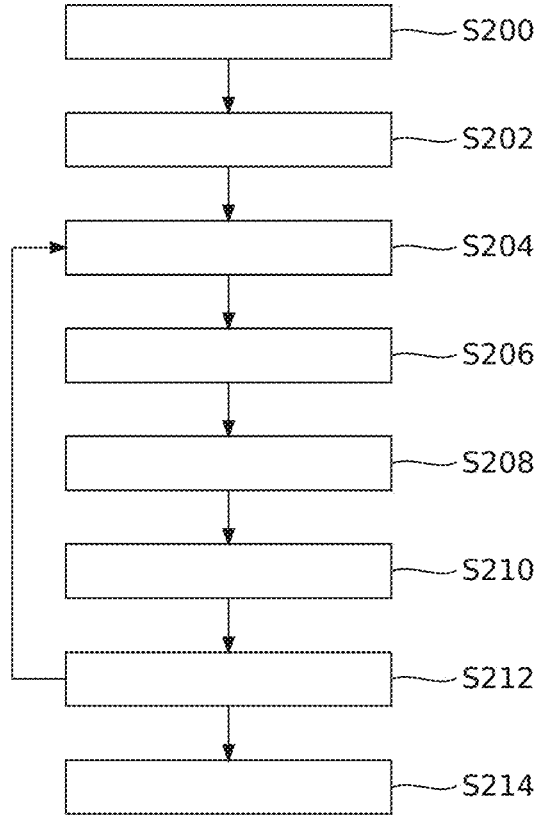
FIG. 2 is a flowchart of a method for manipulating a sample using the sample manipulation device according to FIG. 1, according to some embodiments.

FIG. 2 is a flow chart of the method for manipulating the sample 102 using the sample manipulation device 100 according to FIG. 1.

The process is started in step S200. In step S202, the control unit 130 receives manipulation data. The manipulation data includes at least the manipulation paths 120 along which the sample 102 is to be manipulated. The manipulation paths 120 may be provided in the form of a set of coordinates in a coordinate system referenced to the sample 102. The manipulation paths 120 may also be provided in the form of functional relationships from which sets of coordinates can be determined. However, the manipulation data may also comprise additional information. For example, the manipulation data may comprise parameters of the manipulation process such as a power of the manipulation light, and/or information about the sample 102 from which the control unit 130 may determine said parameters. The manipulation data may be entered into the sample manipulation device 100 via the input unit 130. Alternatively, or additionally, the manipulation data may be generated by the control unit 130, for example using machine learning or another image segmentation method. The manipulation data may also be generated on an external device, and be received by the control unit 130 via the external interface 138.

In step S204 the control unit 130 determines which of the manipulation paths 120 are inside the current field of view 118 of the objective 106, i.e. within the part of the sample 102 currently visible through the objective 106 and displayed via the output unit 134. For example, the control unit 130 may determine whether the coordinates of a manipulation path 120 are within the range of coordinates corresponding to the current field of view 118. In step S206 the control unit 130 determines which of the manipulation paths 120 are outside the predetermined area 136. In the sample manipulation device 100 according to FIG. 1, the predetermined area 136 is a small area around the optical axis O, i.e. the center of the field of view 118. In order to direct the manipulation light beam through the center of the field of view 118, one of the two prisms 126 of the scanning unit 124 needs to be rotated by 180°. Rotating one of the prisms 126 by 180° causes the manipulation light beam to remain almost stationary for some time, which is time consuming and may result in the sample 102 being damaged by overexposure to the manipulation light. Further, optical effects close to the optical axis O result in unwanted deflection of the manipulation light which in turn result in a less precise manipulation. Thus, by not manipulating the sample 102 along a manipulation path 120 that lies at least partially in the predetermined area 136, the sample manipulation device 100 is faster and more precise. The exact shape, size and position of the predetermined area 136 may be known in advance. However, the control unit 130 may also be configured to determine the shape, size and position of the predetermined area 136 during an experiment, for example from optical parameters of the sample manipulation device 100. In the embodiment shown in FIG. 1, the shape, size and position of the predetermined area 136 are determined by the size and position of the prisms 126 in the field of view 118 of the objective 106. The steps S204 and S206 may be performed concurrently or consecutively in any order.

In step S208 the control unit 130 determines a first set of manipulation paths 120 comprising manipulation paths 120 that are both entirely inside the field of view 118, and entirely outside the predetermined area 136. The control unit 130 further determines a second set of manipulation paths 120 comprising all manipulation paths 120 not in the first set of paths. Steps S204 to S208 are further detailed below with reference to FIG. 3. In step S210 the control unit 130 controls the manipulation light source 122, the scanning unit 124, and the objective 106 to manipulation the sample 102 along all manipulation paths 120 in the first set. Step 210 is further detailed below with reference to FIG. 4. In step S212 the control unit 130 controls the sample positioning unit 116 to position the sample 102 such that at least one of the manipulation paths 120 in the second set lies entirely inside the field of view 118, and entirely outside the predetermined area 136. Step 212 is further detailed below with reference to FIG. 5. The steps S204 to S212 are then repeated for the remaining manipulation paths 120 until the sample 102 has been manipulated along all of the manipulation paths 120. The repetition of steps S204 to S212 is further detailed below with reference to FIG. 6. The process in then ended in step S214.

Figure 3:
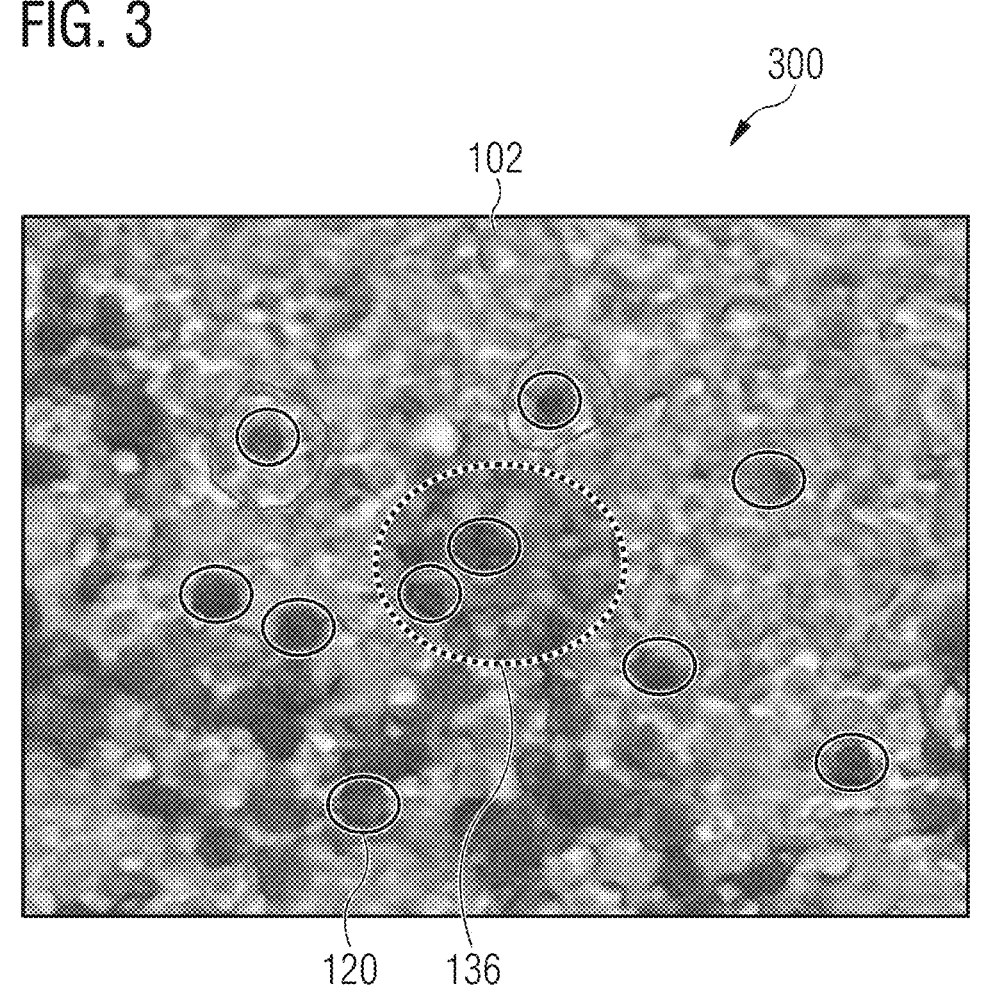
FIG. 3 is a schematic view of a field of view of an objective of the sample manipulation device according to FIG. 1, according to some embodiments.

FIG. 3 is a schematic view of a field of view 300 of the objective 106 of the sample manipulation device 100 according to FIG. 1.

The field of view 300 comprises a magnified view of a part of the sample 102. Nine of the manipulation paths 120 are visible in the field of view 300. Each of the manipulation paths 120 is denoted in FIG. 1 by a solid line. The manipulation paths 120 shown in FIG. 1 are exemplary shown to be circular. The predetermined area 136 is denoted by a dashed circle in the center of the field of view 300. Two of the manipulation paths 120 are completely inside the predetermined area 136. The sample 102 has not been manipulated along any of the manipulation paths 120 shown in FIG. 3. The situation shown in FIG. 3 thus corresponds to steps S204 to S208 of the method described above with reference to FIG. 2, in which the control unit 130 determines along which of the manipulation paths 120 the sample 102 is to be manipulated.

Figure 4:
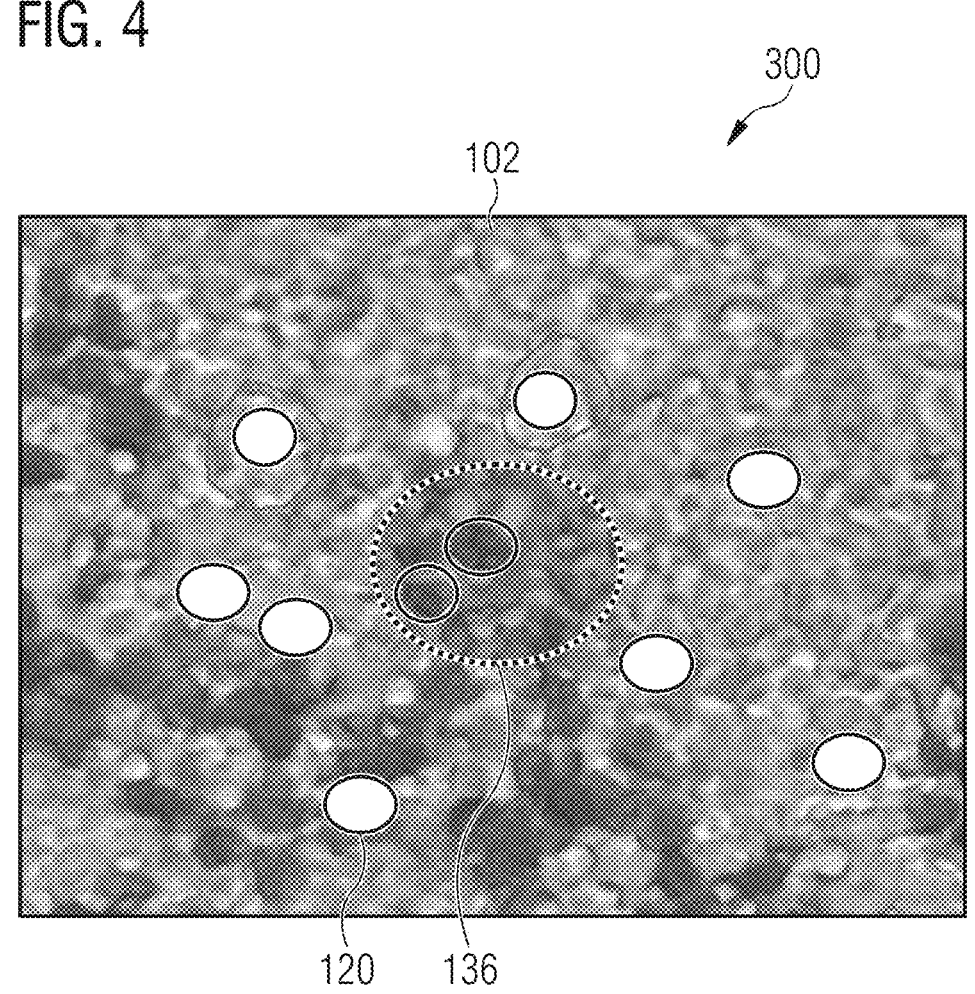
FIG. 4 is another schematic view of the field of view of the objective of the sample manipulation device according to FIG. 1 in which the sample has been manipulated, according to some embodiments.

FIG. 4 is another schematic view of the field of view 300 of the objective 106 of the sample manipulation device 100 according to FIG. 1.

The field of view 300 shown in FIG. 4 comprises the same magnified view of the part of the sample 102 shown in FIG. 3. However, in FIG. 4 the sample 102 has been cut along the seven manipulation paths 120 that are entirely outside the predetermined area 136. The cut-out parts of the sample 102 are denoted in FIG. 4 by the manipulation paths 120 being filled white. The situation shown in FIG. 4 corresponds to step S210 of the method described above with reference to FIG. 2, in which the control unit 130 manipulates the sample 102 along the manipulation paths 120 of the first set.

Figure 5:
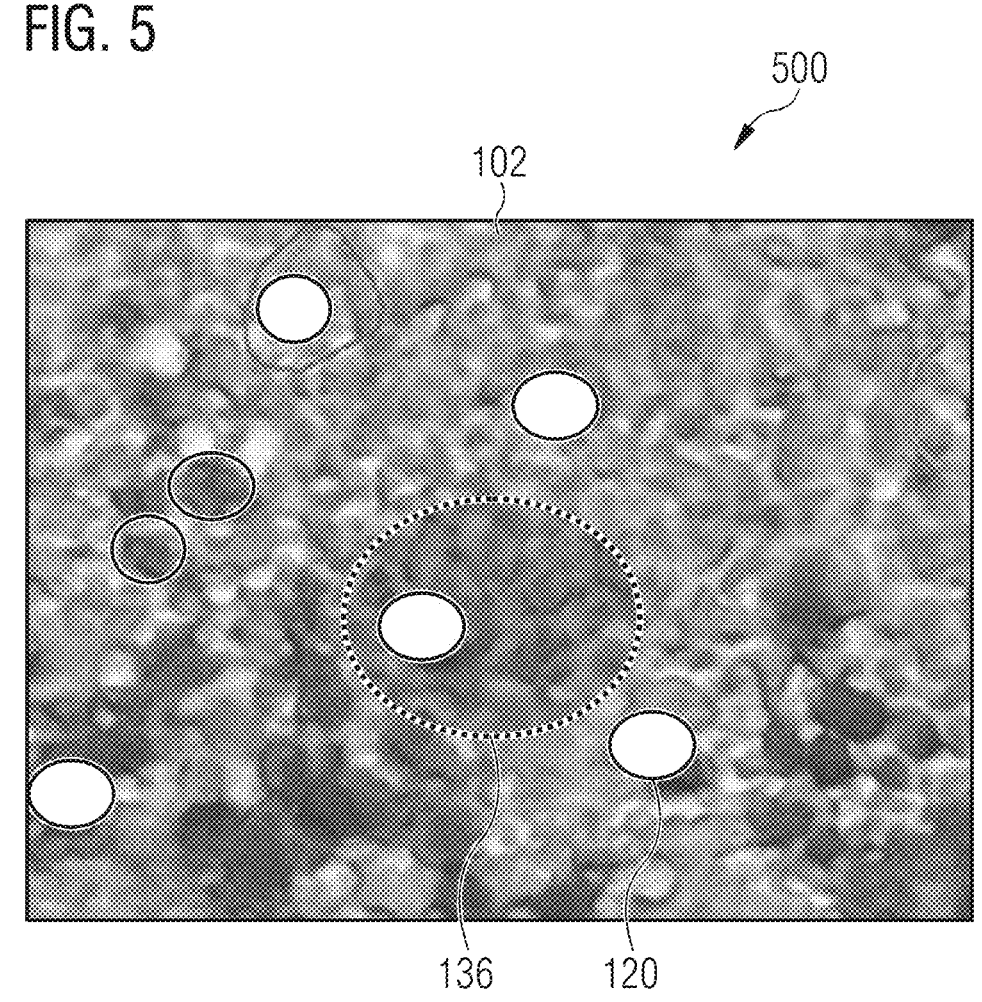
FIG. 5 is another schematic view of the field of view of the objective of the sample manipulation device according to FIG. 1 in which the sample has been moved, according to some embodiments.

FIG. 5 is another schematic view of a field of view 500 of the objective 106 of the sample manipulation device 100 according to FIG. 1.

Compared to FIGS. 3 and 4, in FIG. 5 the sample 102 has been moved by the sample positioning unit 116. Accordingly, the field of view 500 shown in FIG. 5 comprises a magnified view of a different part of the sample 102 than shown in FIGS. 3 and 4. The sample 102 has been moved slightly up and to the left such that the two manipulation paths 120 that were inside the predetermined area 136 in the FIGS. 3 and 4 are now outside the predetermined area 136 but still inside the current field of view 500. The situation shown in FIG. 5 corresponds to step S212 of the method described above with reference to FIG. 2, in which the control unit 130 controls the sample positioning unit 116 to move the sample 102.

Figure 6:
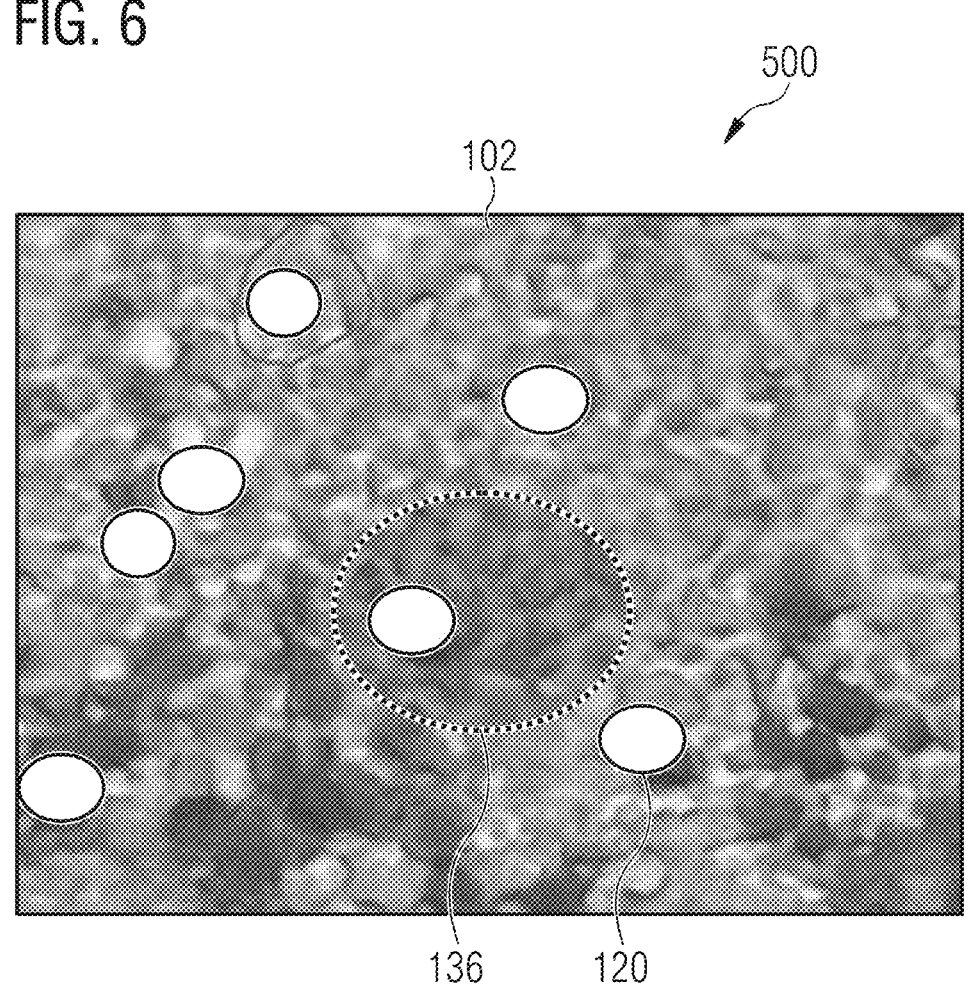
FIG. 6 is another schematic view of the field of view of the objective of the sample manipulation device according to FIG. 1 in which the sample has been manipulated again, according to some embodiments.

FIG. 6 is another schematic view of the field of view 500 of the objective 106 of the sample manipulation device 100 according to FIG. 1.

The field of view 500 shown in FIG. 6 comprises the same magnified view of the part of the sample 102 shown in FIG. 5. However, in FIG. 6 the sample 102 has been cut along the two manipulation paths 120 that were previously within the predetermined area 136. The situation shown in FIG. 6 therefore corresponds to repetition of steps S204 to S212 in the method described above with reference to FIG. 2, in which the sample 102 is manipulated until the sample 102 has been manipulated along all of the manipulation paths 120.

Identical or similarly acting elements are designated with the same reference signs in all Figures. As used herein the term "and/or" includes any and all combinations of one or more of the associated listed items and may be abbreviated as "/". Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Sample manipulation device
102 Sample
104 Optical detection system
106 Objective
108 Tube lens
110 Detector element
112 Beam splitter
114 Illumination system
116 Sample positioning unit
118 Field of view
120 Manipulation path
122 Manipulation light source
124 Scanning unit
126 Prism
128 Drive unit
130 Control unit
132 Input unit
134 Output unit
136 Predetermined area
138 External interface
300 Field of view
500 Field of view

The invention claimed is:

1. A sample manipulation device, comprising
a manipulation light source configured to emit manipulation light;
an objective configured to focus the manipulating light onto a sample to form a manipulation light beam and to image the sample;
a scanning unit configured to move the manipulation light beam within a field of view of the objective;
a sample positioning unit configured to move the sample relative to an optical axis of the objective;
a detector configured to capture an image of the sample formed by the objective; and
a controller configured to:
receive information of a predetermined area of the field of view of the objective;

receive manipulation data comprising at least one manipulation path, wherein the manipulation path is a path on the sample;

receive the image of the sample captured by the detector;

determine, based on the predetermined area and the manipulation path in relation to the image of the sample, whether at least a part of the manipulation path is within or outside the predetermined area;

upon determining that the manipulation path is entirely outside the predetermined area, control the manipulation light source and the scanning unit such that the sample is manipulated along the manipulation path; and upon determining that at least a part of the manipulation path is inside the predetermined area, control the sample positioning unit to move the sample away from the current position such that the manipulation path is entirely outside the predetermined area.

2. The sample manipulation device according to claim 1, wherein the manipulation data comprises at least two manipulation paths, and wherein the controller is configured to:

determine for each respective manipulation path of the manipulation paths whether at least a part of the respective manipulation path is within the predetermined area, determine a first set of manipulation paths comprising one or more manipulation paths that are entirely outside the predetermined area, determine a second set of manipulation paths comprising one or more manipulation paths that are at least partially inside the predetermined area, control the manipulation light source and the scanning unit such that the sample is manipulated along the one or more manipulation paths of the first set of manipulation paths, and control the sample positioning unit to move the sample such that at least one manipulation path of the second set of manipulation paths is entirely outside the predetermined area.

3. The sample manipulation device according to claim 1, wherein the controller is configured to:

determine whether the manipulation path is entirely within the field of view of the objective;

based upon a determination that the manipulation path is entirely within the field of view of the objective and outside the predetermined area, control the manipulation light source and the scanning unit such that the sample is manipulated along the manipulation path; and based upon a determination that the manipulation path is not entirely within the field of view of the objective or at least a part of the manipulation path is inside the predetermined area, control sample positioning unit to move the sample such that the manipulation path is inside the field of view of the objective and outside the predetermined area.

4. The sample manipulation device according to claim 1, wherein the scanning unit comprises two prisms arranged rotatably around the optical axis of the objective between the manipulation light source and the objective.

5. The sample manipulation device according to claim 1, wherein the predetermined area comprises the optical axis of the objective.

6. The sample manipulation device according to claim 1, wherein the predetermined area comprises at least 5% of the field of view of the objective, and at most 25% of the field of view of the objective.

7. The sample manipulation device according to claim 1, wherein the controller is configured to determine the predetermined area based on at least one of an optical parameter of the objective, or an optical parameter of the scanning unit.

8. The sample manipulation device according to claim 1, further comprising an input unit configured to receive a user input, wherein the controller is configured to generate the manipulation data based on the user input.

9. The sample manipulation device according to claim 1, wherein the sample manipulation device is configured to receive the manipulation data via a data storage device and/or a computer network.

10. The sample manipulation device according to claim 1, wherein the controller is configured to generate the manipulation data using machine learning.

11. The sample manipulation device according to claim 1, wherein the manipulation light beam is configured to cut the sample, and wherein the manipulation path is a path on the sample along which the sample is to be cut.

12. The sample manipulation device according to claim 1, wherein the manipulation light source comprises a laser light source.

13. The sample manipulation device according to claim 1, wherein the sample manipulation device comprises a microscope.

14. A method for manipulating a sample using a sample manipulation device, the method comprising:

receiving information of a predetermined area of a field of view of an objective of the sample manipulation device;

receiving manipulation data comprising at least one manipulation path, wherein the manipulation path is a path on the sample;

receiving an image of the sample captured by a detector of the sample manipulation device;

determining, based on the predetermined area and the manipulation path in relation to the image of the sample, whether at least a part of the manipulation path is within or outside the predetermined area;

upon determining that the manipulation path is entirely outside the predetermined area, manipulating the sample along the manipulation path using a manipulation light beam emitted by a manipulation light source and a scanning unit configured to move the manipulation light beam within the field of view; and based upon a determination determining that at least a part of the manipulation path is inside the predetermined area, moving the sample using a sample positioning unit such that the manipulation path is entirely outside the predetermined area.

15. A non-transitory computer-readable medium having program steps stored thereon, the program steps, when executed by a computer processor, causing performance of a method for manipulating a sample using a sample manipulation device, the method comprising:

receiving information of a predetermined area of a field of view of an objective of the sample manipulation device;

receiving manipulation data comprising at least one manipulation path, wherein the manipulation path is a path on the sample;

receiving an image of the sample captured by a detector of the sample manipulation device;

determining, based on the predetermined area and the manipulation path in relation to the image of the sample, whether at least a part of the manipulation path is within or outside the predetermined area;

upon determining that the manipulation path is entirely outside the predetermined area, manipulating the sample along the manipulation path using a manipulation light beam emitted by a manipulation light source and a scanning unit configured to move the manipulation light beam within the field of view; and upon determining that at least a part of the manipulation path is inside the predetermined area, moving the sample using a sample positioning unit such that the manipulation path is entirely outside the predetermined area.

* * * * *